United States Patent
Hu et al.

(10) Patent No.: US 11,874,542 B2
(45) Date of Patent: Jan. 16, 2024

(54) LIGHT CONTROL GLASS AND METHOD FOR DETECTING TENSION THEREOF

(71) Applicants: Beijing BOE Sensor Technology Co., Ltd., Beijing (CN); BOE Technology Group Co., Ltd., Beijing (CN)

(72) Inventors: Dahai Hu, Beijing (CN); Chen Meng, Beijing (CN); Siheng Xu, Beijing (CN); Zhong Hu, Beijing (CN); Jiarong Liu, Beijing (CN); Wenjie Zhong, Beijing (CN); Guo Liu, Beijing (CN); Binbin Liu, Beijing (CN); Yongbo Wang, Beijing (CN)

(73) Assignees: BEIJING BOE SENSOR TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 491 days.

(21) Appl. No.: 17/279,707

(22) PCT Filed: May 27, 2020

(86) PCT No.: PCT/CN2020/092565
§ 371 (c)(1),
(2) Date: Mar. 25, 2021

(87) PCT Pub. No.: WO2021/237504
PCT Pub. Date: Dec. 2, 2021

(65) Prior Publication Data
US 2022/0197071 A1   Jun. 23, 2022

(51) Int. Cl.
G02F 1/133 (2006.01)
E06B 9/24 (2006.01)
G01L 5/10 (2020.01)

(52) U.S. Cl.
CPC ............ G02F 1/13306 (2013.01); E06B 9/24 (2013.01); G01L 5/10 (2013.01); *E06B 2009/2464* (2013.01)

(58) Field of Classification Search
CPC ................... G02F 1/13306; E06B 9/24; E06B 2009/2464; G01L 5/10
USPC ........................................................ 359/245
See application file for complete search history.

(56) References Cited

FOREIGN PATENT DOCUMENTS

CN           111155901 A    *   5/2020

\* cited by examiner

*Primary Examiner* — William Choi
(74) *Attorney, Agent, or Firm* — Nath, Goldberg & Meyer; Joshua B. Goldberg (57) ABSTRACT

The present disclosure provides a light control glass and a method for detecting a tension thereof. The light control glass includes: two opposite glass substrates with a receiving space therebetween; and a tension detection circuit board in the receiving space. The light control glass further includes a first electromagnetic plug coupled to the tension detection circuit hoard, and a joint of the first electromagnetic plug is exposed from an outer edge of the two opposite glass substrates.

20 Claims, 5 Drawing Sheets

LIGHT CONTROL GLASS AND METHOD FOR DETECTING TENSION THEREOF

This is a National Phase Application filed under 35 U.S.C. 371 as a national stage of PCT/CN2020/092565, filed May 27, 2020, the content of which is hereby incorporated by reference in its entirety.

TECHNICAL FIELD

The present disclosure relates to the technical field of window display, and particularly relates to a light control glass (a light adjusting glass or a dimming glass) and a method for detecting tension thereof.

BACKGROUND

A liquid crystal glass in a smart window (an intelligent window or a wisdom window) is coupled to an FPC (Flexible Printed Circuit) board through a pad PAD. When the liquid crystal glass is coupled to the FPC, the pad on the FPC board often falls off due to an external force.

SUMMARY

According to one aspect of the present disclosure, a light control glass is provided. The light control glass includes: two opposite glass substrates with a receiving space between the two opposite glass substrates, and a tension detection circuit board in the receiving space, wherein the light control glass further includes a first electromagnetic plug coupled to the tension detection circuit board, and a joint of the first electromagnetic plug is exposed from an outer edge of the two opposite glass substrates.

In some embodiments, the light control glass further includes an encapsulation region along a periphery of the receiving space between the two opposite glass substrates, the encapsulation region being provided with an encapsulation adhesive to encapsulate liquid crystals in the receiving space, wherein the tension detection circuit board and the first electromagnetic plug are in the encapsulation region.

In some embodiments, the light control glass further includes a groove in the encapsulation region on at least one of opposite surfaces of the two opposite glass substrates, the groove being provided to receive the first electromagnetic plug such that an end of the joint of the first electromagnetic plug is flush with the outer edge of the two opposite glass substrates.

In some embodiments, the tension detection circuit board is provided with: a tension sensor configured to detect a tension applied to the first electromagnetic plug.

In some embodiments, the tension detection circuit board is further provided with: a microcontroller coupled to the tension sensor and the first electromagnetic plug, respectively; and an electromagnetic controller coupled to the first electromagnetic plug and the microcontroller, respectively.

In some embodiments, the light control glass further includes: a control board configured to supply power to the tension detection circuit board; a flexible printed circuit coupled to the control board; and a second electromagnetic plug respectively coupled to the flexible printed circuit and the first electromagnetic plug, wherein the first electromagnetic plug is an electromagnetic female plug, and the second electromagnetic plug is an electromagnetic male plug.

In some embodiments, the tension detection circuit board is a glass-based circuit board and has a structure of a multi-layer circuit board, and each layer of the tension detection circuit board includes a pad, wherein the pad include two first pads and at least one second pad, the two first pads are respectively on a top layer and a bottom layer of the tension detection circuit board; the at least one second pad is respectively on an intermediate layer between the top layer and the bottom layer of the tension detection circuit board, and orthographic projections of the two first pads on the tension detection circuit board coincide with an orthographic projection of the at least one second pad on the tension detection circuit board, the first pad has a thickness greater than a thickness of the second pad, and one of the two first pads is a ground pad, and an isolation region is provided around the two first pads and around the at least one second pad.

In some embodiments, the light control glass further includes: a through hole at a position where the two first pads and the at least one second pad are located in a direction perpendicular to the tension detection circuit board, the through hole being provided with a solder pillar for connecting the layers of the tension detection circuit board.

According to one aspect of the present disclosure, a method for detecting a tension of a light control glass is provided. The method includes: detecting, by a tension detection circuit board, a tension applied to a first electromagnetic plug, a joint of which is exposed from an outer edge of two opposite glass substrates, after a power is supplied to the tension detection circuit board in an receiving space between the two opposite glass substrates, wherein the tension applied to the first electromagnetic plug includes a magnetic adsorption force and an external tension; and comparing the detected tension of the first electromagnetic plug with a threshold, and disconnecting the first electromagnetic plug in response to the detected tension being greater than the threshold.

In some embodiments, the method further includes: pre-storing the threshold in a memory prior to detecting the tension applied to the first electromagnetic plug by using the tension detection circuit board in the receiving space, and plugging the first electromagnetic plug and a second electromagnetic plug together before the power is supplied to the tension detection circuit board, the first electromagnetic plug and the second electromagnetic plug being further coupled to each other through the magnetic attraction force after the power is supplied to the tension detection circuit board.

DETAILED DESCRIPTION

Figure 1A:
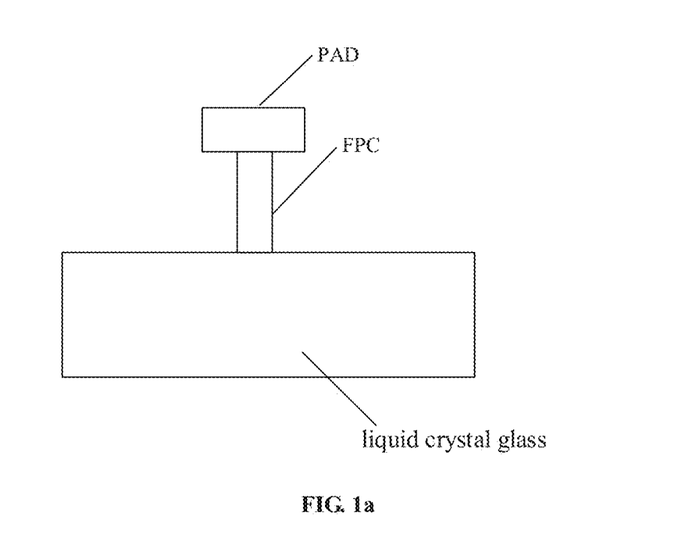
FIG. 1a is a schematic diagram illustrating a connection between a liquid crystal glass and an FPC in the related art.
Figure 1B:
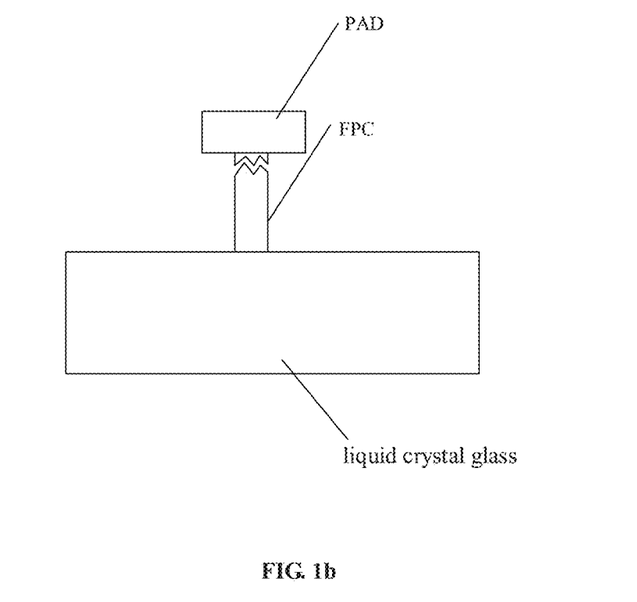
FIG. 1b is a schematic diagram illustrating a disconnection between a liquid crystal glass and an FPC in the related art.

As shown in FIG 1a, a liquid crystal glass in a smart window is coupled to a circuit board by an FPC hoard. As shown in FIG. 1b, when the liquid crystal glass is coupled to the circuit board, a pad on the FPC board between liquid crystal glasses often falls off due to an external force, resulting in out of use of a whole liquid crystal glass. A demonstration on a client side often fails due to a sudden fracture of the FPC especially in sending a client sample.

Figure 2:
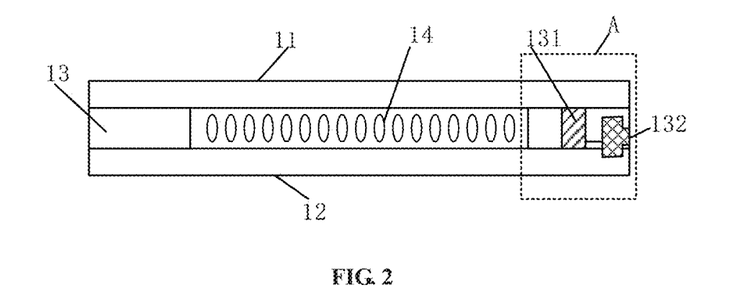
FIG. 2 is a schematic diagram illustrating a structure of a light control glass according to an embodiment of the present disclosure.

Thus, according to one aspect of the present disclosure, a light control glass is provided. As shown in FIG. 2, the light control glass includes: two glass substrates 11 and 12 opposite to each other, with a receiving space S between the two glass substrates; and a tension detection circuit board 131 in the receiving space S. The light control glass further includes a first electromagnetic plug 132 coupled to the tension detection circuit board, and a joint of the first electromagnetic plug 132 is exposed from an outer edge of the two opposite glass substrates.

Figure 3:
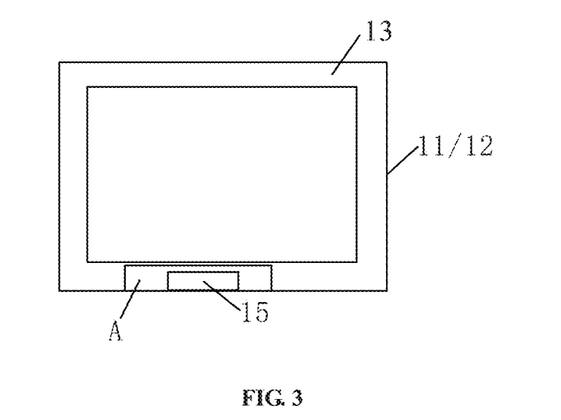
FIG. 3 is a schematic diagram illustrating a glass substrate according to an embodiment of the present disclosure.

As shown in FIGS. 2 and 3. the two opposite glass substrates include a first substrate 11 and a second substrate 12. An encapsulation region 13 is also provided between the two opposite glass substrates along a periphery of the receiving space. The encapsulation region 13 is provided with an encapsulation adhesive to encapsulate liquid crystals 14 in the receiving space S. The tension detection circuit board and the first electromagnetic plug 132 are located in the encapsulation region 13.

As shown in FIG. 2, the tension detection circuit board 131 is located in a region A around the receiving space S, and the region A is located in the encapsulation region 13. As shown in FIG. 3, a groove 15 is provided in the encapsulation region 13 of at least one of opposite surfaces of the two opposite glass substrates 11 and 12, and the groove 15 is used to receive the first electromagnetic plug 132 such that the end of the first electromagnetic plug 132 is flush with the outer edge of the two opposite glass substrates. The tension detection circuit board 131 can detect a tension applied to the first electromagnetic plug 132. When the applied tension is greater than a predetermined threshold, a cut-off signal from the tension detection circuit board 131 is sent to disconnect the first electromagnetic plug 132 from other circuits (such as an FPC, which will be taken as an example), which is beneficial to protecting a cable coupled to the first electromagnetic plug 132.

Figure 4:
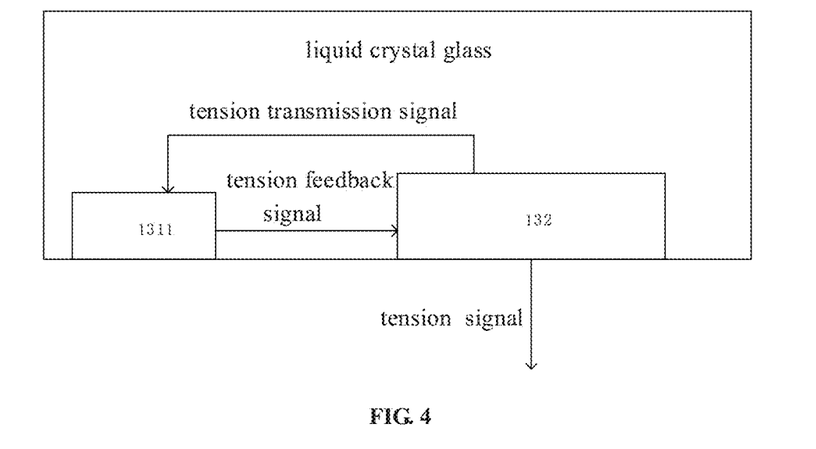
FIG. 4 is a schematic diagram illustrating a tension detection circuit board according to an embodiment of the present disclosure.

In some embodiments, FIG. 4 illustrates a schematic top view of the region A in FIG 2. and schematically illustrates the connection between the tension detection circuit board 131 and the first electromagnetic plug 132. The tension detection circuit board 131 has a tension sensor 1311, which is located at a position where the tension applied to the first electromagnetic plug 132 may be detected, to detect the tension applied to the first electromagnetic plug 132. The tension sensor 1311 is used to detect a tension applied to the first electromagnetic plug 132 when the first electromagnetic plug 132 is coupled to the FPC, so as to obtain a tension transmission signal of the first electromagnetic plug 132. Then, a tension feedback signal is sent to a corresponding control circuit through the first electromagnetic plug 132. The control circuit sends a corresponding cut-off signal based on the tension feedback signal, so as to make the first electromagnetic plug 132 coupled or not coupled to other circuits. The tension sensor 1311 may be located on an opposite side of the first electromagnetic plug 132 with respect to the tension applied thereto, e.g., the other side thereof with respect to the joint.

Figure 5:
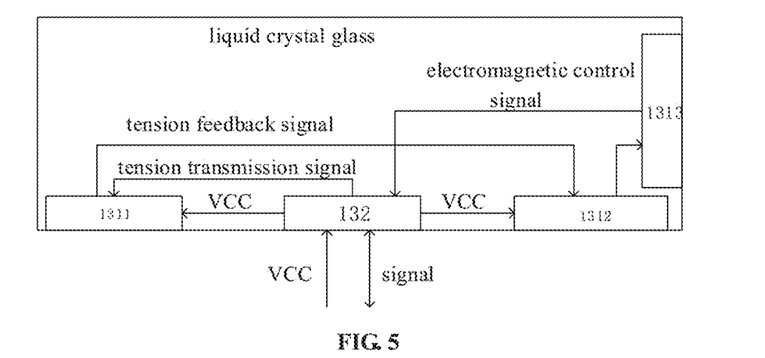
FIG. 5 is a schematic diagram illustrating a tension detection circuit board according to an embodiment of the present disclosure.

In some embodiments. FIG. 5 illustrates a schematic top view of the region A in FIG. 2, in addition to the tension sensor 1311, the tension detection circuit board further includes: a microcontroller (MCU) 1312 coupled to the tension sensor 1311 and the first electromagnetic plug 132, respectively; and an electromagnetic controller 1313 coupled to the first electromagnetic plug 132 and the microcontroller 1312, respectively. In the embodiment, the tension sensor 1311 obtains the tension transmission signal from the first electromagnetic plug 132, and sends the tension feedback signal obtained based on the tension transmission signal to the microcontroller 1312. The microcontroller 1312 compares the applied tension and the predetermined threshold. If the applied tension is less than the threshold, the microcontroller 1312 does not send out the cut-off signal; and if the applied tension is greater than or equal to the threshold, the microcontroller 1312 sends the cut-off signal to the electromagnetic controller 1313. The connection between the first electromagnetic plug 132 and the FPC circuit is cut off by the electromagnetic controller 1313 to protect the cable from being fractured.

As shown in FIG. 2, the tension detection circuit board 131 and the first electromagnetic plug 132 are located in the area A of the encapsulation region 13, such that space can be effectively saved, and the tension detection circuit board 131 and the first electromagnetic plug 132 can be effectively hided.

The tension sensor 1311, the microcontroller 1312, and the electromagnetic controller 1313 constitute a microcircuit. The microcircuit is on an insulating substrate (such as a glass base substrate). The microcircuit and the insulating substrate constitute the tension detection circuit board. The microcircuit may he powered at VCC from an external control board through the first electromagnetic plug 132. In a case where the microcircuit is coupled to the first electromagnetic plug 132, when the light control glass is coupled to a circuit board such as the FPC, if the external force applied to the first electromagnetic plug 132 is greater than the predetermined threshold, the tension feedback signal from the tension sensor 1311 is sent to the electromagnetic controller 1313 through the microcontroller 1312, such that the first electromagnetic plug 132 and the FPC may be disconnected, thereby protecting the FPC.

Figure 7A:
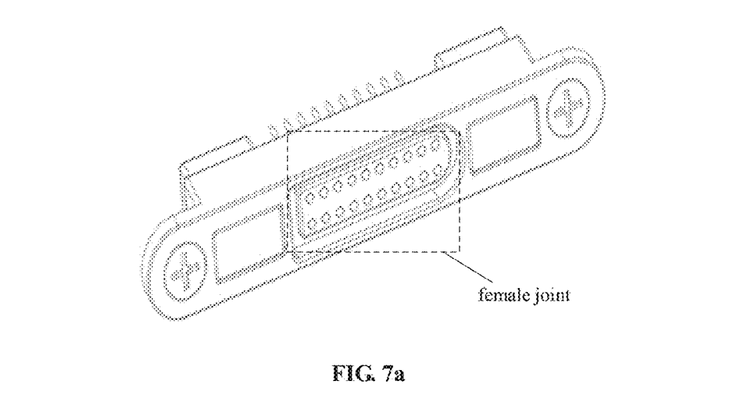
FIG. 7a is a schematic diagram illustrating a structure of a first electromagnetic plug according to an embodiment of the present disclosure.

The electromagnetic plug includes a female joint or a male joint. In some embodiments, the first electromagnetic plug 132 includes an electromagnetic female joint, as shown in FIG. 7a. The electromagnetic plug having the electromagnetic female joint does not have a protruding portion as compared with the electromagnetic plug having an electromagnetic male joint.

Figure 6:
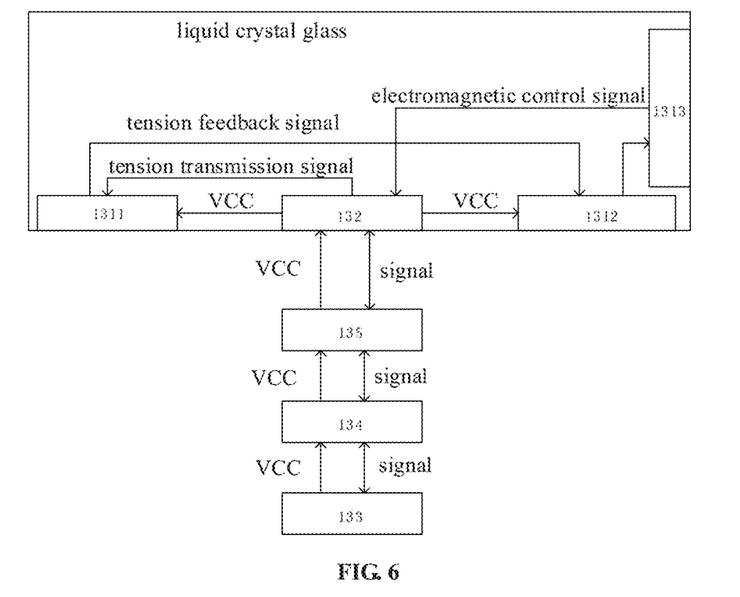
FIG. 6 is a schematic diagram illustrating a circuit of a light control glass according to an embodiment of the present disclosure.

In some embodiments, as shown in FIG. 6, the light control glass further includes: a control board 133 configured to supply power to the tension detection circuit board; an FPC 134 coupled to the control board 133; and a second electromagnetic plug 135 coupled to the FPC 134 and the first electromagnetic plug 132, respectively. The control board 133 supplies power to the tension sensor 1311 and the microcontroller 1312 through the FPC 134, the second electromagnetic plug 135, and the first electromagnetic plug 132 sequentially.

Figure 7B:
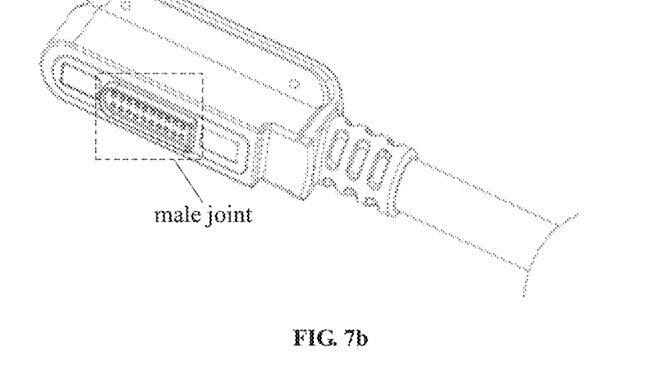
FIG. 7b is a schematic diagram illustrating a structure of a second electromagnetic plug according to an embodiment of the present disclosure.

In some embodiments, the second electromagnetic plug 135 includes an electromagnetic male joint, as shown in FIG. 7b, corresponding to the first electromagnetic plug 132 having the electromagnetic female joint. The connection between the first electromagnetic plug 132 and the second electromagnetic plug 135 may be more stable and waterproof by using the first electromagnetic plug 132 having the electromagnetic female joint and the mating second electromagnetic plug 135 having the electromagnetic male joint.

In the present disclosure, the fracture risk of the pad on the FPC coupled to the liquid crystal glass in the smart window can be effectively reduced, and the efficiency and convenience of assembly and dismantlement can be improved simultaneously, by embedding and integrating the tension detection circuit board 131 into the space between the liquid crystal glasses, thereby ensuring normal and long-term use of each of the opposite liquid crystal glasses.

In some embodiments, the tension detection circuit board 131 may have a structure of a glass-based multi-layer circuit board, as shown in FIG. 7. For the tension detection circuit board 131, the tension sensor 1311, the microcontroller 1312, and the electromagnetic controller 1313 are located at different layers of the tension detection circuit board 131, and each layer of the tension detection circuit board 131 includes a pad. At least two first pads 1314 and at least one second pad 1315 are provided on the multi-layer circuit board of the tension detection circuit board 131. The control board 133 may also have a structure of a glass-based multi-layer circuit board, and may also be a PCB.

Figure 8:
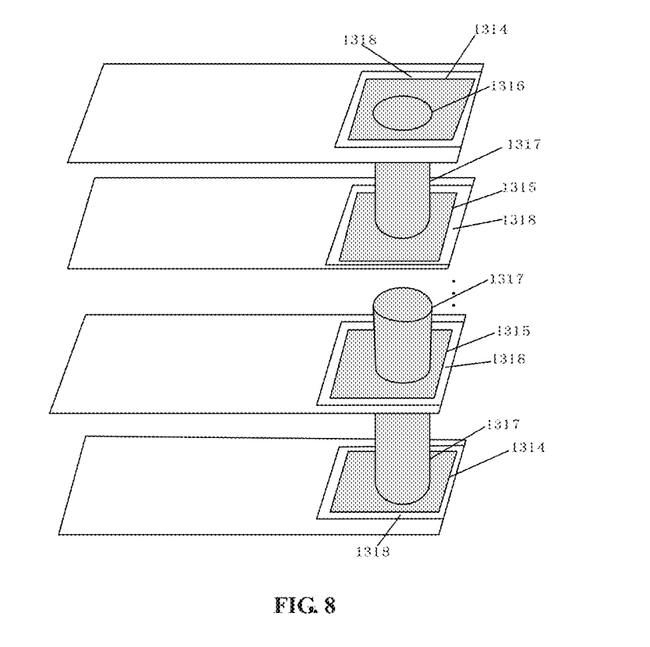
FIG. 8 is a schematic diagram illustrating a pad on a multi-layer tension detection circuit board according to an embodiment of the present disclosure.

As shown in FIG. 8, for the tension detection circuit board 131, the two first pads 1314 are respectively located on a top layer and a bottom layer of the tension detection circuit board 131; and the at least one second pad 1315 is located on an intermediate layer 1318 between the top layer and the bottom layer of the tension detection circuit board, respectively. Orthographic projections of the two first pads 1314 on the tension detection circuit board 131 coincide with an orthographic projection of the at least one second pad 1315 on the tension detection circuit board 131.

Since a pad on a traditional circuit board is simply adhered to the circuit board surface and a periphery of the pad is covered by green oil (liquid light induced solder resist), a falling off of the pad and a damage to the component on the pad due to high temperature may easily occur in revising repeatedly and high temperature welding, which may result in not use of the whole circuit board. Meanwhile, the pad is difficult to be adhered to the surface of the glass-based circuit board due to technology and cost control, so that the whole circuit board cannot be normally used. Meanwhile, the component on the circuit board is easy to overheat at high temperature due to long-time output test and lack of effective heat dissipation.

Therefore, as shown in FIG. 8, based on the orthographic projection relationship between the first pad 1314 and the second pad 1315, for the glass-based tension detection circuit board 131 and the control board 133, a through hole 1316 is formed to penetrate through the tension detection circuit board 131 or the control board 133 at a position where the two first pads 1314 and the at least one second pad 1315 are located along a direction perpendicular to the tension detection circuit board 131 or the control board 133.

A solder pillar 1317 for connecting the layers of the tension detection circuit board 131 is formed in the through hole 1316. A material of the solder pillar 1317 may include solder.

FIG. 8 illustrates a technical scheme for punching in the pad. The fastness and adherence of the pad on the top and bottom layers can be enhanced through the connection of the layers in the multi-layer circuit board by punching in the pad, such that the pad on the glass-based circuit board can be more easily adhered to the top surface and the bottom surface of the glass-based circuit board, thereby preventing the pad from falling off and avoiding the pad not adhered to the glass surface in revising repeatedly and high temperature welding. Meanwhile, since the heat dissipation area is increased, the heat dissipation effect is correspondingly enhanced, such that the temperature and the power consumption of the components on the surfaces can be better controlled, and the components on the surfaces can be prevented from being burnt.

The technical scheme for punching in the pad can be realized in the following. A glass-based or non-glass-based multi-layer (more than or equal to two layers) circuit board is prepared. A thin second pad is adhered to each layer of intermediate layers or a metal isolation fixing region is provided for each layer of the intermediate layers by using reflow soldering technology or wave soldering technology. As shown in FIG. 8, two first pads 1314 and at least one second pad 1315 are located at corners of the respective layers, and two opposite surfaces of the glasses forming the space therebetween may serve as the top and bottom layers of the tension detection circuit board. Then, the first pad with a normal thickness are adhered to the top and the bottom layers, that is to say, the first pad has a thickness greater than that of the second pad, so that the thickness of the circuit board is reduced while all layers of the circuit board is ensured to he coupled securely. Then, the pads of the top and bottom layers are regarded as common surfaces to be punched, and each layer of the circuit boards may be coupled to each other through the through hole, as shown in FIG. 8. The pads on each layer may be coupled to each other by using a through hole reflow soldering technology.

In some embodiments, one of the first pads 1314 is a ground pad.

In some embodiments, an isolation region 1318 is provided around the two first pads 1314 and around the at least one second pad 1315. As shown in FIG. 8, the isolation region 1318 serves to isolate the pad region from other structures on the circuit board, so as to prevent electromagnetic interference with each other.

Figure 9:
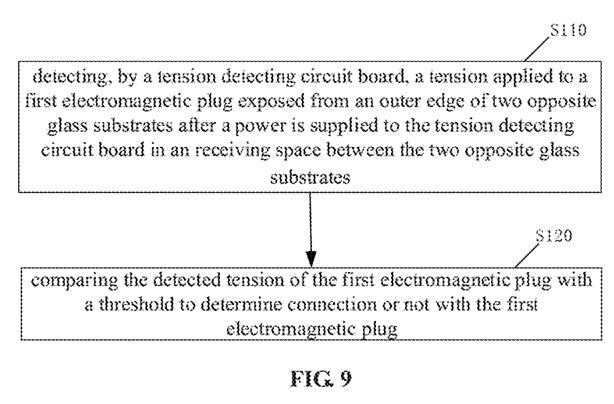
FIG. 9 is a schematic diagram illustrating a method for detecting a light control glass according to an embodiment of the present disclosure.

According to one aspect of the present disclosure, a method for detecting the tension applied to the light control glass as described above is provided. As shown in FIG. 9, the method includes the following steps.

At a step S110, after a power is supplied to the tension detection circuit board in the receiving space, a tension applied to the first electromagnetic plug, a joint of which is exposed from the outer edge of the two opposite glass substrates, is detected by the tension detection circuit board. In this case, the tension applied to the first electromagnetic plug includes a magnetic attraction force due to the power supply and a tensile force externally applied.

At a step S120, the detected tension applied to the first electromagnetic plug is compared with a threshold. If the detected tension is greater than the threshold, the connection with the first electromagnetic plug is cut off, or the connection with the first electromagnetic plug is kept.

Before the power is supplied to the tension detection circuit board in the receiving space, the first electromagnetic plug and the second electromagnetic plug are plugged together. In this case, the force of inserting connection between the first electromagnetic plug and the second electromagnetic plug is far smaller than the magnetic attraction force between the first electromagnetic plug and the second electromagnetic plug after the power is supplied to the tension detection circuit board in the space between the glasses. Therefore, since the force of inserting connection between the first electromagnetic plug and the second electromagnetic plug is small before the power is supplied, the first electromagnetic plug and the second electromagnetic plug are easy to disconnect to protect the cable coupled to the first electromagnetic plug and the second electromagnetic plug. Since the magnetic attraction force between the first electromagnetic plug and the second electromagnetic plug is very great after the power is supplied, the first electromagnetic plug and the second electromagnetic plug are difficult to be disconnected to protect stable connection between the first electromagnetic plug and the second electromagnetic plug.

After the power is supplied, the first electromagnetic plug and the second electromagnetic plug are further stably coupled to each other through the magnetic attraction force. Due to the magnetic attraction force of the second electromagnetic plug to the first electromagnetic plug, the first electromagnetic plug is subjected a first value of the tension (namely the magnetic attraction force) in a direction towards to the second electromagnetic plug, and the tension sensor may detect the first value of the tension (namely the magnetic attraction force).The first value of the tension may be determined from a power supply voltage. When an external tension is applied to the first electromagnetic plug, the external tension is combined with the magnetic attraction force from the second electromagnetic plug, so that the tension applied to the first electromagnetic plug is increased. A second value of the combined tension applied to the first electromagnetic plug is detected by the tension sensor, and is sent to the microcontroller.

Whether or not the second value of the tension applied to the first electromagnetic plug is greater than a predetermined threshold is compared by the microcontroller. When the second value is less than the threshold, the microcontroller does not send a cut-off signal; and when the second value is larger than or equal to the threshold, the microcontroller sends the cut-off signal to the electromagnetic controller. The connection between the first electromagnetic plug and the second electromagnetic plug is cut off by the electromagnetic controller to protect the cable from being fractured.

The setting of the threshold may be adjusted according to different application scenes of the liquid crystal glass, for example, the threshold of a vehicle-mounted glass is larger than that of an architectural glass, and the threshold of the architectural glass is larger than that of a decorative glass. Also, the threshold is stored before detecting the tension of plugging and unplugging the first electromagnetic plug.

What is claimed is:

1. A light control glass, comprising:
   two opposite glass substrates with a receiving space between the two opposite glass substrates; and
   a tension detection circuit board in the receiving space, wherein the light control glass further comprises a first electromagnetic plug coupled to the tension detection circuit board, and a joint of the first electromagnetic plug is exposed from an outer edge of the two opposite glass substrates.

2. The light control glass of claim 1, further comprising an encapsulation adhesive, which is located in an encapsulation region along a periphery of the receiving space between the two opposite glass substrates, to encapsulate liquid crystals in the receiving space, wherein the tension detection circuit board and the first electromagnetic plug are in the encapsulation region.

3. The light control glass of claim 1, wherein the tension detection circuit board comprises a tension sensor for detecting a tension applied to the first electromagnetic plug.

4. The light control glass of claim 1, further comprising:
   a control board configured to supply power to the tension detection circuit board;
   a flexible printed circuit coupled to the control board; and
   a second electromagnetic plug respectively coupled to the flexible printed circuit and the first electromagnetic plug, wherein the first electromagnetic plug is an electromagnetic female plug, and the second electromagnetic plug is an electromagnetic male plug.

5. The light control glass of claim 1, wherein,
   the tension detection circuit board is a glass-based circuit board and has a structure of a multi-layer circuit board, and each layer of the tension detection circuit board comprises at least one pad,
   the at least one pad comprises two first pads and at least one second pad,
   the two first pads are respectively on a top layer and a bottom layer of the tension detection circuit board;
   the at least one second pad is respectively on an intermediate layer between the top layer and the bottom layer of the tension detection circuit board, and orthographic projections of the two first pads on the tension detection circuit board coincide with an orthographic projection of the at least one second pad on the tension detection circuit board,
   the first pad has a thickness greater than a thickness of the second pad, and one of the two first pads is a ground pad, and
   an isolation region is provided around the two first pads and around the at least one second pad.

6. The light control glass of claim 2, further comprising a groove in the encapsulation region on at least one of opposite surfaces of the two opposite glass substrates, the groove being provided to receive the first electromagnetic plug such that an end of the joint of the first electromagnetic plug is flush with the outer edge of the two opposite glass substrates.

7. The light control glass of claim 2, wherein the tension detection circuit board comprises a tension sensor for detecting a tension applied to the first electromagnetic plug.

8. The light control glass of claim 2, further comprising:
   a control board configured to supply power to the tension detection circuit board;
   a flexible printed circuit coupled to the control board; and
   a second electromagnetic plug respectively coupled to the flexible printed circuit and the first electromagnetic plug, wherein the first electromagnetic plug is an electromagnetic female plug, and the second electromagnetic plug is an electromagnetic male plug.

9. The light control glass of claim 2, wherein,
   the tension detection circuit board is a glass-based circuit board and has a structure of a multi-layer circuit board, and each layer of the tension detection circuit board comprises at least one pad, the at least one pad comprises two first pads and at least one second pad, the two first pads are respectively on a top layer and a bottom layer of the tension detection circuit board;

the at least one second pad is respectively on an intermediate layer between the top layer and the bottom layer of the tension detection circuit board, and orthographic projections of the two first pads on the tension detection circuit board coincide with an orthographic projection of the at least one second pad on the tension detection circuit board, the first pad has a thickness greater than a thickness of the second pad, and one of the two first pads is a ground pad, and an isolation region is provided around the two first pads and around the at least one second pad.

10. The light control glass of claim 6, wherein the tension detection circuit board comprises a tension sensor for detecting a tension applied to the first electromagnetic plug.

11. The light control glass of claim 6, further comprising:
a control board configured to supply power to the tension detection circuit board;
a flexible printed circuit coupled to the control board; and
a second electromagnetic plug respectively coupled to the flexible printed circuit and the first electromagnetic plug, wherein the first electromagnetic plug is an electromagnetic female plug, and the second electromagnetic plug is an electromagnetic male plug.

12. The light control glass of claim 6, wherein,
the tension detection circuit board is a glass-based circuit board and has a structure of a multi-layer circuit board, and each layer of the tension detection circuit board comprises at least one pad,
the at least one pad comprises two first pads and at least one second pad,
the two first pads are respectively on a top layer and a bottom layer of the tension detection circuit board;
the at least one second pad is respectively on an intermediate layer between the top layer and the bottom layer of the tension detection circuit board, and orthographic projections of the two first pads on the tension detection circuit board coincide with an orthographic projection of the at least one second pad on the tension detection circuit board,
the first pad has a thickness greater than a thickness of the second pad, and one of the two first pads is a ground pad, and
an isolation region is provided around the two first pads and around the at least one second pad.

13. The light control glass of claim 10, wherein the tension detection circuit board further comprises:
a microcontroller coupled to the tension sensor and the first electromagnetic plug, respectively; and
an electromagnetic controller coupled to the first electromagnetic plug and the microcontroller, respectively.

14. The light control glass of claim 10, further comprising:
a control board configured to supply power to the tension detection circuit board;
a flexible printed circuit coupled to the control board; and
a second electromagnetic plug respectively coupled to the flexible printed circuit and the first electromagnetic plug, wherein the first electromagnetic plug is an electromagnetic female plug, and the second electromagnetic plug is an electromagnetic male plug.

15. The light control glass of claim 10, wherein,
the tension detection circuit board is a glass-based circuit board and has a structure of a multi-layer circuit board, and each layer of the tension detection circuit board comprises at least one pad,
the at least one pad comprises two first pads and at least one second pad,
the two first pads are respectively on a top layer and a bottom layer of the tension detection circuit board;
the at least one second pad is respectively on an intermediate layer between the top layer and the bottom layer of the tension detection circuit board, and orthographic projections of the two first pads on the tension detection circuit board coincide with an orthographic projection of the at least one second pad on the tension detection circuit board,
the first pad has a thickness greater than a thickness of the second pad, and one of the two first pads is a ground pad, and
an isolation region is provided around the two first pads and around the at least one second pad.

16. The light control glass of claim 13, further comprising:
a control board configured to supply power to the tension detection circuit board;
a flexible printed circuit coupled to the control board; and
a second electromagnetic plug respectively coupled to the flexible printed circuit and the first electromagnetic plug, wherein the first electromagnetic plug is an electromagnetic female plug, and the second electromagnetic plug is an electromagnetic male plug.

17. The light control glass of claim 16, wherein,
the tension detection circuit board is a glass-based circuit board and has a structure of a multi-layer circuit board, and each layer of the tension detection circuit board comprises at least one pad,
the at least one pad comprises two first pads and at least one second pad,
the two first pads are respectively on a top layer and a bottom layer of the tension detection circuit board;
the at least one second pad is respectively on an intermediate layer between the top layer and the bottom layer of the tension detection circuit board, and orthographic projections of the two first pads on the tension detection circuit board coincide with an orthographic projection of the at least one second pad on the tension detection circuit board,
the first pad has a thickness greater than a thickness of the second pad, and one of the two first pads is a ground pad, and
an isolation region is provided around the two first pads and around the at least one second pad.

18. The light control glass of claim 17, further comprising a through hole at a position where the two first pads and the at least one second pad are located in a direction perpendicular to the tension detection circuit board, the through hole being provided with a solder pillar for connecting the layers of the tension detection circuit board.

19. A method for detecting a tension of a light control glass, comprising:
detecting, by a tension detection circuit board, a tension applied to a first electromagnetic plug, a joint of which is exposed from an outer edge of two opposite glass substrates, after a power is supplied to the tension detection circuit board in an receiving space between the two opposite glass substrates, wherein the tension applied to the first electromagnetic plug comprises a magnetic adsorption force and an external tension; and comparing the detected tension of the first electromagnetic plug with a threshold, and disconnecting the first electromagnetic plug in response to the detected tension being greater than the threshold.

20. The method of claim 19, further comprising pre-storing the threshold in a memory prior to detecting the tension applied to the first electromagnetic plug by using the tension detection circuit board in the receiving space, and plugging the first electromagnetic plug and a second electromagnetic plug together before the power is supplied to the tension detection circuit board, the first electromagnetic plug and the second electromagnetic plug being further coupled to each other through a magnetic attraction force after the power is supplied to the tension detection circuit board.

* * * * *